(12) United States Patent
Mardini et al.

(10) Patent No.: US 9,359,089 B2
(45) Date of Patent: Jun. 7, 2016

(54) ANCHORING HARPOON AND ASSOCIATED ANCHORING METHOD

(71) Applicant: DCNS, Paris (FR)

(72) Inventors: Christian Mardini, Angouleme (FR); Gilles Gaicon, Brie (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/824,655

(22) PCT Filed: Nov. 8, 2012

(86) PCT No.: PCT/EP2012/072186
§ 371 (c)(1),
(2) Date: Mar. 18, 2013

(87) PCT Pub. No.: WO2013/068496
PCT Pub. Date: May 16, 2013

(65) Prior Publication Data
US 2015/0217871 A1    Aug. 6, 2015

(30) Foreign Application Priority Data

Nov. 8, 2011   (FR) ...................................... 11 60140

(51) Int. Cl.
*B64F 1/12*  (2006.01)

(52) U.S. Cl.
CPC ...................................... *B64F 1/125* (2013.01)

(58) Field of Classification Search
CPC .............. B64F 1/12; B64F 1/125; B64F 1/16; F16B 21/16
See application file for complete search history.

(56) References Cited

U.S. PATENT DOCUMENTS

| 5,480,108 | A  | * | 1/1996  | Amiand et al. ................ 244/115 |
| 8,727,276 | B2 | * | 5/2014  | Affre De Saint Rome ... 244/115 |
| 8,783,608 | B2 | * | 7/2014  | Affre De Saint Rome ... 244/115 |
| 8,876,047 | B2 | * | 11/2014 | Proutiere .................. 244/114 B |
| 8,991,754 | B2 | * | 3/2015  | Affre De Saint Rome ... 244/115 |
| 2011/0233332 | A1 | * | 9/2011 | Proutiere ...................... 244/115 |
| 2012/0068013 | A1 | * | 3/2012 | Affre De Saint Rome ... 244/115 |
| 2012/0091272 | A1 | * | 4/2012 | Affre De Saint Rome ... 244/110 R |
| 2012/0112003 | A1 | * | 5/2012 | Affre De Saint Rome ... 244/115 |

FOREIGN PATENT DOCUMENTS

| FR |      2943988 A1 | * | 10/2010 | |
| WO | WO 2010112716 A1 | * | 10/2010 | ................ B64F 1/16 |
| WO | WO 2010112717 A1 | * | 10/2010 | ................ B64F 1/16 |
| WO | WO 2010112780 A1 | * | 10/2010 | ................ B64F 1/16 |

* cited by examiner

*Primary Examiner* — Philip J Bonzell
(74) *Attorney, Agent, or Firm* — Knobbe Martens Olson & Bear LLP

(57) ABSTRACT

The harpoon comprises a bistable actuator (34) having a rod (56) for actuating the finger (32) the rod being movable between a retracted resting position and an extended position of deployment of the finger (32).

Figure 1:
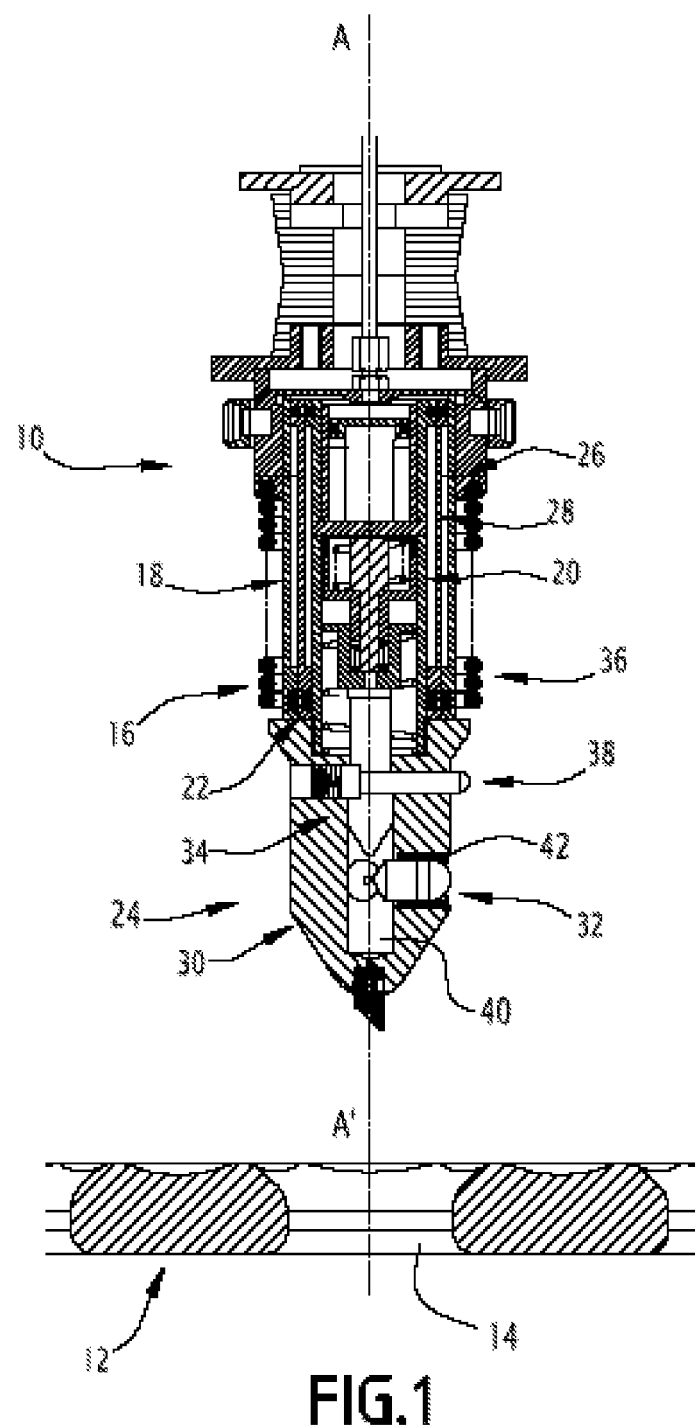

The bistable actuator (34) comprises a tappet (52) that is movable during a first impulse comprising a stroke (34) in a first direction and then a stroke in a second direction opposite to the first direction in order to cause the switch of the rod (56) from its retracted position to its extended position.

The tappet (52) is movable during a second impulse comprising a stroke in the first direction and then a stroke in the second direction in order to cause the switch of the rod (56) from its extended position to its retracted position.

The actuator (34) is configured so as to allow the return of the rod (56) to its retracted position when the tappet (52) moves along the first stroke in the first direction during the second impulse.

12 Claims, 7 Drawing Sheets

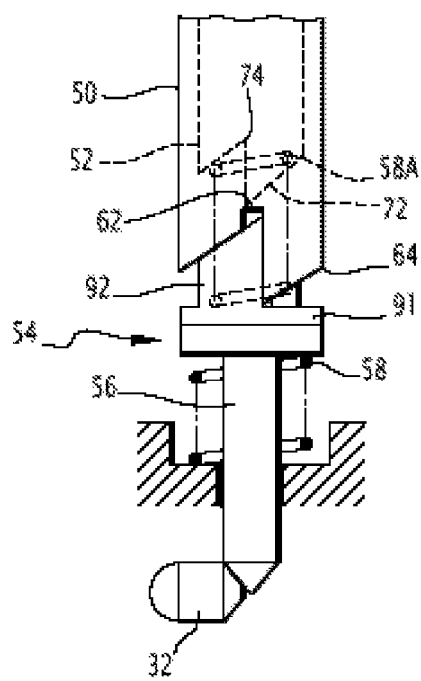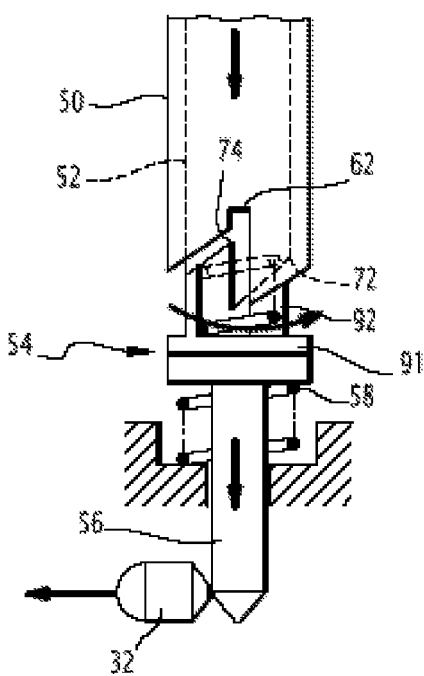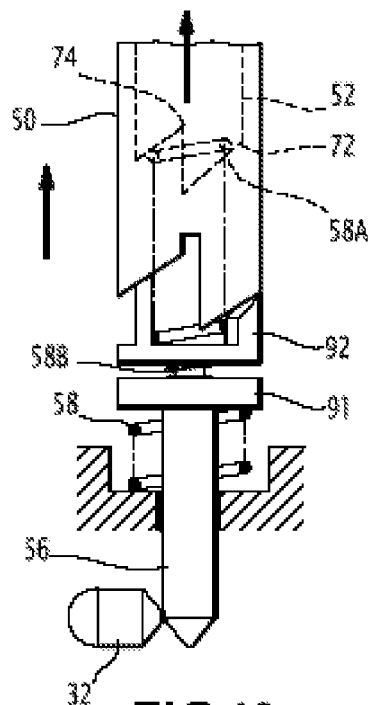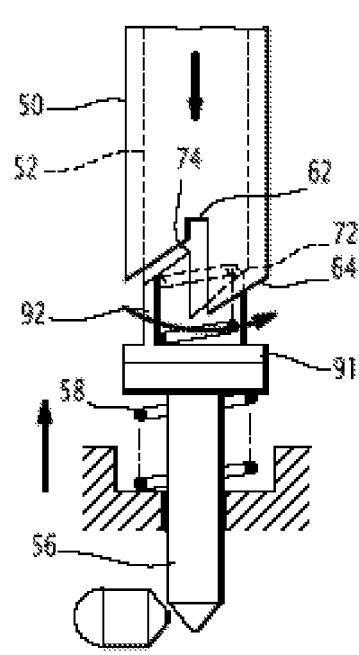

ANCHORING HARPOON AND ASSOCIATED ANCHORING METHOD

CROSS-REFENCE TO RELATED APPLICATIONS

This application is the U.S. National Phase under 35. U.S.C. §371 of International Application PCT/EP2012/072186, filed Nov. 8, 2012 which claims priority to French Patent Application No. 11 60140, filed Nov. 8, 2011. The disclosures of the above-described application are hereby incorporated by reference in their entirety.

The present invention relates to a harpoon for anchoring in particular a flying object capable of cooperating with an anchoring grid of a platform, the harpoon comprising:
- a cylinder;
- a piston provided with a rod projecting out beyond the cylinder, the free end of the rod comprising an anchoring head in the grid and at least one anchoring finger deployable relative to the anchor head between a retracted position and an active position projecting outwards;
- a bistable actuator including an rod for actuating the or each finger, the actuating rod being movable between a retracted resting position allowing the retraction of the or each finger and an extended position of deployment of the or each finger, the bistable actuator comprising a tappet that is movable during a first impulse comprising a stroke in a first direction along an axis of movement, and then a stroke in a second direction opposite to the first direction, in order to cause the switch of the actuating rod from its retracted position to its extended position, the tappet being movable during a second impulse comprising a stroke in the first direction and then a stroke in the second direction in order to cause the switch of the actuating rod from its extended position to its retracted position.

Such a harpoon is intended for example to enable the landing of a flying object on a vessel and to maintain the flying object fixed to the deck of the ship. The flying object is in particular an aircraft, such as a drone, in particular a rotary wing UAV (unmanned aerial vehicle).

In a known manner, an anchoring harpoon includes three essential, reversible functionalities. A first functionality is to ensure the penetration of the harpoon in a grid on deck during the docking of the flying object. Then, according to a second functionality, the harpoon is secured in the grid by the deployment of indexing fingers which prevent the extraction of the harpoon and of the flying object. Then, according to a third functionality the securing down of the flying object on the deck is ensured by means of a spring or securing jack.

In order to achieve all these functionalities, the practice of using a harpoon with two separate control systems is already known. A first system is used to lock and unlock the harpoon into the grid. Another system is used to secure the flying object against the grid. This type of harpoon is not entirely satisfactory, since it is structurally complex and cumbersome, especially for a number of cycles and a given clamping force.

To overcome this problem, the patent application FR 2 943 990 describes a harpoon equipped with a bistable actuator having an actuating rod for the anchoring fingers. During a first control impulse of the actuator, the actuating rod for the anchoring fingers moves in a first direction towards an extended position thereby enabling the movement of the fingers and ensuring they are held in the deployed position.

Once locked, the movement of the actuator in a second direction opposite to the first direction allows to generate a clamping force by means of an external spring interposed between the cylinder and the harpoon head.

To unlock the system, the actuator is again moved following a second impulse including a movement in the first direction and then in the second direction. During the movement in the second direction, the actuating rod is retracted and the harpoon is disengaged from the grid under the effect of elastic recall produced by the exterior biasing spring.

Such a system is generally satisfactory, since it is simple to implement by means of using a single actuator.

However, the system can be further improved. Indeed, in some cases, the rising of the harpoon head out of the grid under the effect of the exterior spring occurs before the total retraction of the anchoring fingers. The anchoring fingers are then likely to remain stuck under the grid and partially lock the system.

An object of the invention is therefore to obtain an anchoring harpoon that offers a very simple structure and mode of operation and provides improved reliability.

To this end, the invention relates to an anchoring harpoon of the aforementioned type, characterised in that the actuator is configured so as to allow the return of the actuating rod to its retracted position when the tappet moves along the first stroke in the first direction during the second impulse.

The harpoon according to the invention may comprise one or more of the following features, taken in isolation or according to any technically possible combination:
- it includes a rotating member that is rotatable relative to the tappet and relative to the actuating rod the rotating member being interposed between the tappet and the actuating rod, the rotating member having at least one protrusion intended to cooperate with the tappet so as to cause the rotation of the rotating member;
- the tappet defines at least one first notch and at least one second notch spaced angularly in relation to the first notch, the first notch being intended to receive the protrusion during the first impulse, the second notch being intended to receive the protrusion during the second impulse, the second notch having a depth greater than that of the first notch;
- the distance separating the bottom of the first notch and the bottom of the second notch along the axis of movement of the tappet is substantially equal to or greater than the stroke of the actuating rod between its extended position and its retracted position,
- each first notch and each second notch is delineated by at least one edge that is inclined relative to a plane that is perpendicular to the axis of movement of the tappet;
- the inclined edge of the second notch includes a first inclined region, and a second inclined region, the first inclined region advantageously having an inclination that is less than that of the second inclined region;
- the bistable actuator comprises a sleeve that is movable together with the piston rod, the tappet being mounted so as to be movable in the sleeve, the sleeve delineating a plurality of nicks for receiving the radial protrusion designed to receive the radial protrusion at the end of each impulse;
- it comprises a first interior spring biasing member, interposed between the anchoring head and the actuating rod in order to resiliently bias the actuating rod to its retracted position;
- it comprises an exterior spring biasing member, intended to be interposed between the anchoring head and a member for fastening to the flying object, in order to cause a resilient bias of the actuator head towards the fastening member, the stiffness of the exterior spring biasing member being greater than the stiffness of the first interior spring biasing member;

the cylinder comprises at least two telescopic cylinder parts the one being within the other, so as to be movable between a retracted position where one is retracted into the other and an active position with one protruding out in relation to the other.

The invention also relates to a method for anchoring a harpoon on an anchoring grid, the method comprising the following steps:

insertion of the anchoring head of a harpoon as described above in a cell of the grid, actuating the tappet so as to execute a first impulse comprising a stroke in a first direction, and then a stroke in a second direction opposite to the first direction along an axis of movement in order to cause the switch of the actuating rod from its retracted position to its extended position;

deployment of the anchoring fingers to their active position projecting outwards;

then, actuating the tappet so as to execute a second impulse comprising a stroke in the first direction, and then a stroke in the second direction along the axis of movement;

return of the actuating rod to its resting position during the second impulse, during the first stroke of the tappet in the first direction, before the second stroke of the tappet in the second direction.

The method according to the invention may comprise one or more of the following characteristic features, taken in isolation or according to any technically possible combination:

it includes, after the return of the actuating rod to its retracted position, the extraction of the anchoring head out of the grid.

Figure 2:
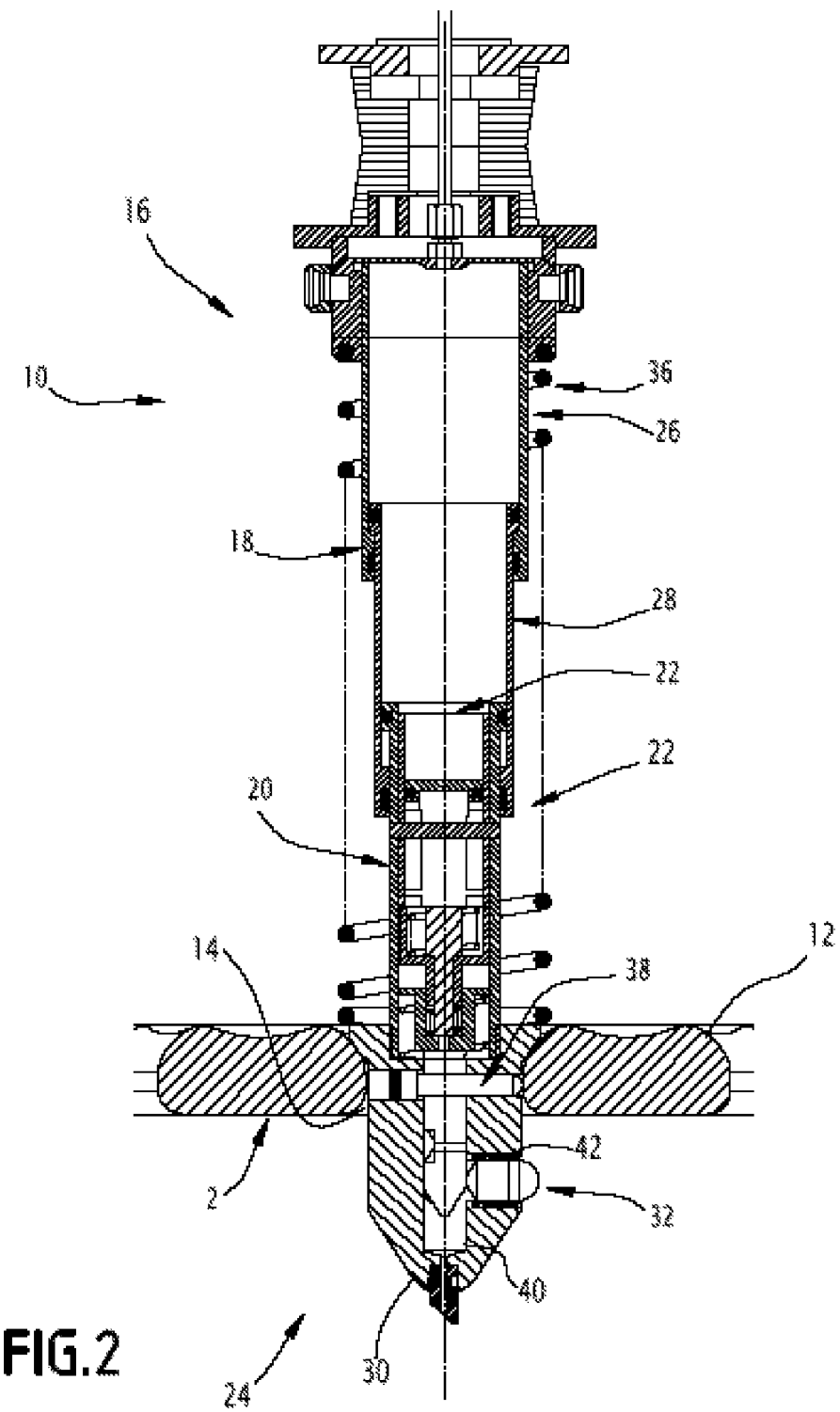
Figure 3:
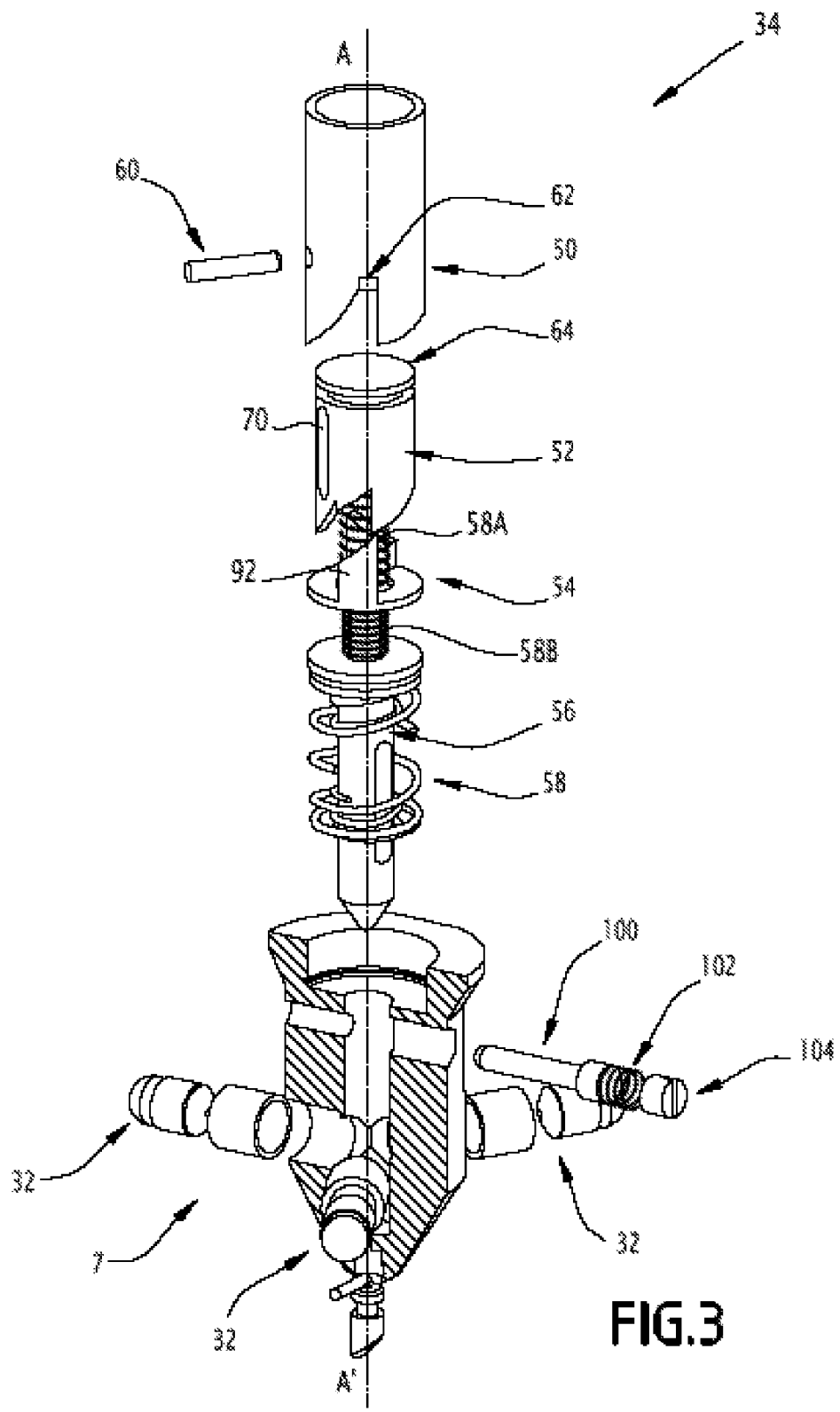
Figure 4:
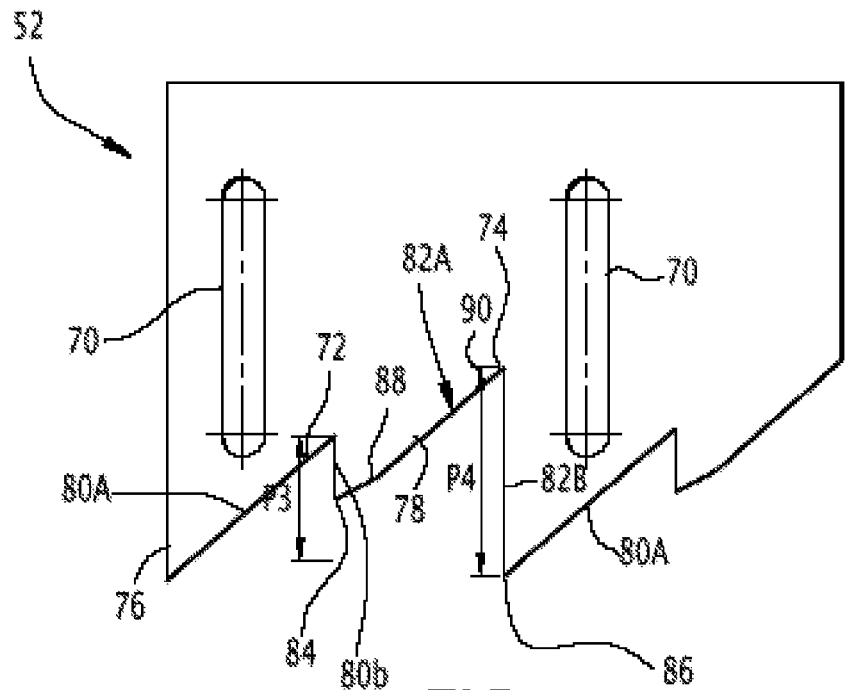
Figure 5:
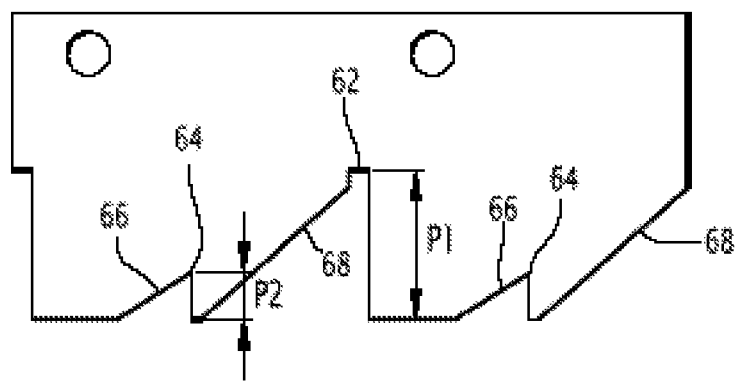
Figure 6:
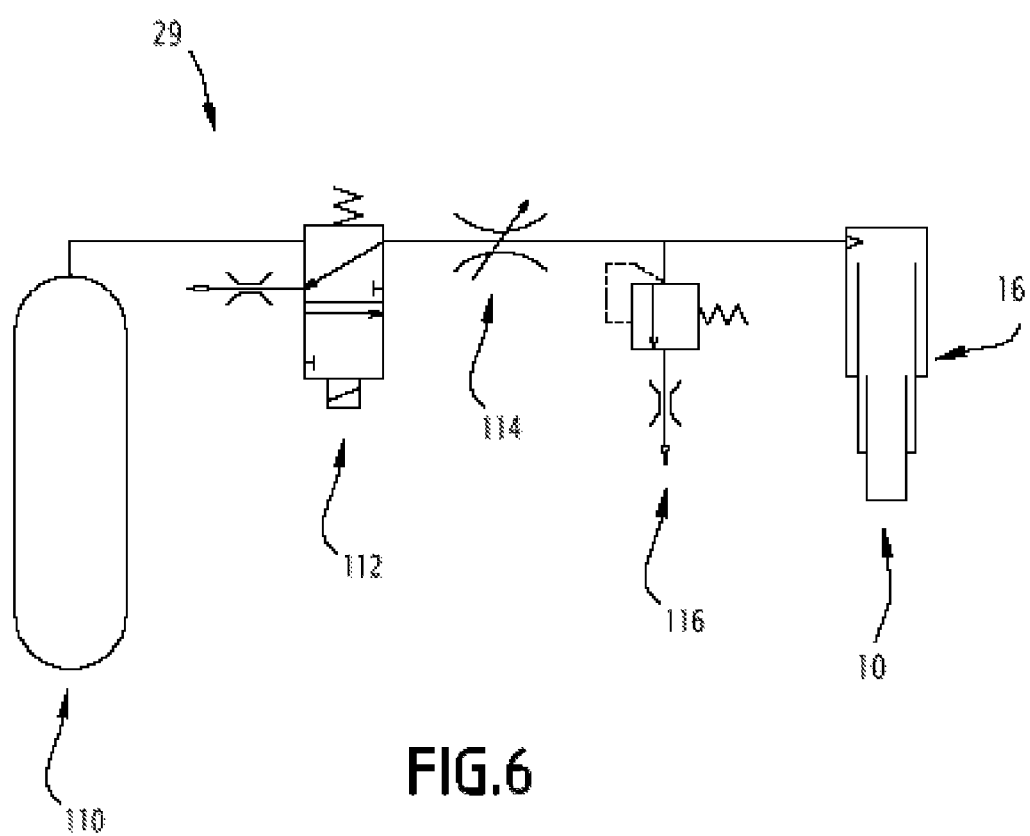
Figure 7:
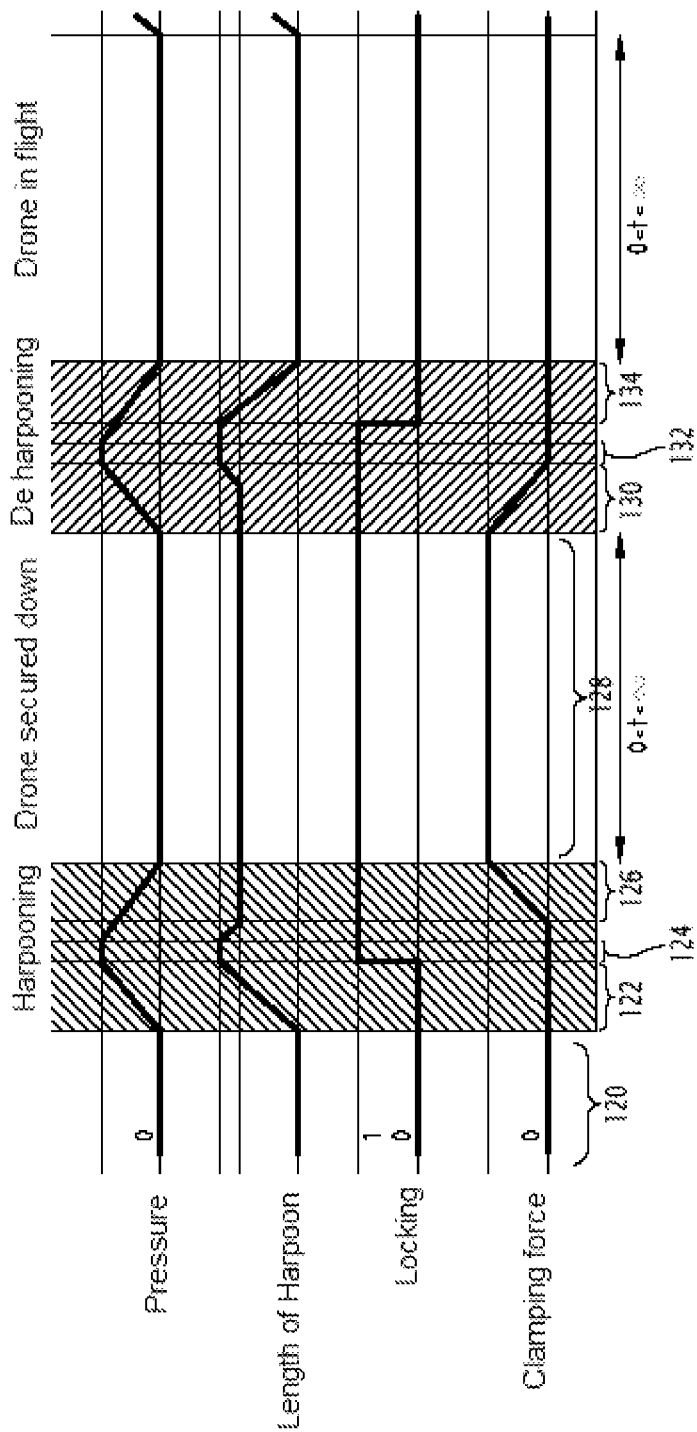

The invention shall be better understood upon reading the following description, given purely by way of example, with reference made to the accompanying drawings, wherein:

FIG. 1 is a cross sectional view of an anchoring harpoon according to the invention, in a retracted position with respect to the anchoring g rid, FIG. 2 is a view similar to FIG. 1 in a position of insertion of the harpoon head into the grid, FIG. 3 is an exploded perspective view of a harpoon head and of the bistable actuator mounted in a harpoon according to the invention, FIG. 4 is a developed view of the profile of the tappet of the actuator in FIG. 3, FIG. 5 is a developed view of the profile of the corresponding sleeve, FIG. 6 is a block diagram illustrating the supply of fluid under pressure to the harpoon according to the invention, FIG. 7 illustrates the different phases of operation of the harpoon according to the invention, FIGS. 8 to 11 schematically illustrate different phases of operation of the actuator in FIG. 3.

An anchoring harpoon 10 according to the invention is illustrated in FIGS. 1 and 2. This anchoring harpoon 10 is in particular intended to be mounted on a flying object (not shown) in order to enable the anchoring of the flying object on a platform of a type such as a military vessel or other.

The flying object is for example an aircraft, such as a drone, in particular a rotary wing unmanned aerial vehicle.

The harpoon 10 is intended to cooperate with an anchoring grid 12 of the platform delineating at least one cell 14 for receiving the harpoon.

As shown in FIGS. 1 and 2, the harpoon 10 includes a jack 16 comprising a cylinder 18 and a piston 20, the piston 20 being provided with a rod 22 that is extendable in relation to the cylinder 18.

The harpoon 10 further includes a lower anchoring assembly 24 mounted on the rod 22 and intended to cooperate with the grid 12 in order to fix the harpoon 10 onto the grid 12.

In the advantageous variant shown in FIG. 1, the cylinder 18 of the jack 16 includes at least two telescopic cylinder parts 26, 28 placed one in the other.

The cylinder parts 26, 28 are movable between a retracted position where one is retracted into the other (FIG. 1) and an active anchoring position, with one protruding out in relation to the other (FIG. 2).

The cylinder 18 and in particular the upper cylinder portion 26 is fixed under the flying object by means of a fastening member, of a known structure.

A free end of the upper portion 26 is open for receiving the lower portion 28 mounted so as to be able to slide along an axis of deployment A-A', represented vertically in FIG. 1.

The lower portion 28 is open downwards to receive, mounted so as to be able to slide along the axis A-A', the rod 22 on which the anchoring assembly 24 is mounted.

The rod 22 of the piston 20 is mounted s o as to be able to slide along the axis A-A' in the cylinder 18, in particular in the lower portion 28 of the cylinder.

The interior of the cylinder 18 and the piston 20 are connected to a source 29 for supplying pressurised fluid, shown in FIG. 6 through a control unit so as to control their operation, that is to say, the deployment of the piston 20 relative to the cylinder 18, the deployment proper of the cylinder 18, where it is composed of at least two parts 26, 28 and, advantageously, the actuation of the anchoring assembly 24.

The anchoring assembly 24 includes an anchor head 30 intended to be engaged in a cell 14 of the grid 12 and retaining fingers 32 deployable radially in relation to the anchor head 30 between a retracted position and an active position projecting out radially relative to the rest of the head 30, in order to anchor the head 30 in the grid 12.

The anchoring assembly 24 further includes a bistable actuator 34 for controlling the deployment and the retraction of the fingers 32, and an exterior biasing member 36, intended for the recall of the anchor head 30 to the flying object. The exterior biasing member 36 ensures, when the anchor head 30 is anchored in the grid 12, the correct securing down of the flying object on the platform.

Advantageously, the anchoring assembly 24 further includes a trigger for arming 38 of the actuator 34, intended to inhibit the movement of the fingers 32 to the active position as long as the anchor head 30 is not disposed in abutment against the anchoring grid 12, that is to say in the correct anchoring position in the grid 12.

The anchor head 30 advantageously has a downwardly converging shape. It internally delineates an axial passage 40 for the movement of a rod of the actuator 34 and for each anchoring finger 32, a radial passage 42 for movement of the finger 32, which opens into the axial passage 40.

As seen here above, the anchor head 30 is fixedly mounted to the lower end of the rod 22 of the piston 20.

In the example shown in FIG. 1, the anchoring assembly 24 comprises three fingers 32 arranged at 120° in relation to each other. The number of fingers is generally between 1 and 5.

Each finger 32 is movable between a retracted position and an active position projecting out radially relative to the rest of the head 30.

In the retracted position, the fingers 32 are completely accommodated in the radial passage 42. The head 30 is then able to slide axially along the axis A-A' in the cell 14 in a first direction downwards and in a second direction upwards.

In the active position projecting out radially, as shown in FIG. 2, the fingers 32 project out beyond the anchor head 30 to abut against the anchoring grid 12 during the axial movement along A-A' of the anchor head 30 in the cell 14 in the second direction.

The bistable actuator 34 is illustrated more particularly in FIG. 3. The actuator 34 comprises, from top to bottom in FIG. 3, a guide sleeve 50 intended to be integrally secured axially to the rod 22 of the piston 20, and a tappet 52 mounted in the guide sleeve 50 so as to be movable along the axis A-A', between a retracted position in the sleeve 50 and an deployed position extended outside of the sleeve 50.

The actuator 34 further comprises a rotating member 54 intended to cooperate alternately with the guide sleeve 50 and with the tappet 52 in order to be moved in rotation about the axis A-A' and an actuating rod 56 for actuating the fingers 32. The actuating rod 56 is mounted in the head 30 so as to be movable between an extended position of actuation of the fingers 32 and a retracted resting position.

The bistable actuator 34 also includes a first interior member 58 for spring biasing of the actuating rod 56 to its retracted position, a second interior member 58A for spring biasing of the tappet 52 to its retracted position and a third interior member 58B for biasing of the rotating member 54 against the actuating rod 56.

The guide sleeve 50 is movable together with the piston 20. In this example, it is attached to the rod 22 of the piston 20 by means of a fastening member 60. The fastening member 60 is advantageously formed by a through pin mounted transversely through the rod 22 and the sleeve 50.

In reference to FIG. 5, the lower end of the sleeve 62 delineates an alternation of first nicks 62 and second nicks 64 for indexing the rotating member 54, the nicks 62, 64 being connected to each other by first and second inclined tracks 66, 68.

As is visible in FIG. 5, the first nicks 62 have a depth P1, taken along the axis A-A', which is greater than the depth P2 of the second nicks 64. They advantageously have a flat bottom delimited by two straight vertical edges.

The second nicks 64 are formed at the upper end of the first inclined track 66 and includes a vertical right edge.

Each second nick 64 is interposed angularly between two consecutive first nicks 62. In a similar manner, each first nick 62 is interposed angularly between two consecutive second nicks 64.

The tappet 52 is mounted to be exclusively movable in linear fashion along the axis A-A' 50.

To this end, the angular indexing means constituted in this example by the fastening member 60 and by the corresponding longitudinal slots 70 formed in the wall of the tappet 52 prevents the rotation of the tappet 52 relative to the sleeve 50 about the axis A-A'.

The tappet 52 has a serrated lower edge. It thus comprises an alternation of first notches 72 and second notches 74 distributed angularly about the axis A-A' and bounded by the teeth 76, 78 of varying heights arranged in alternating fashion.

The first notches 72 have a depth P3 that is less than the depth P4 of the second notches 74, the depths being taken along the axis A-A'. As will be seen further here below, the difference between the depth P3 of each first notch 72 and the depth P4 of each second notch 74 is greater than or equal to the stroke of the actuating rod 56 between its extended position and its retracted position.

Each first notch 72 is delimited by a first inclined edge 80A and a second straight edge 80B.

Each second notch 74 is delimited by a second inclined edge 82A and a second straight edge 82B.

In an advantageous variant, the height of the straight edge 80B of the first notch 72 is less than the height of the straight edge 82B of the second notch 74.

Thus, the common end 84 between the straight edge 80B of the second notch 74 and the inclined edge 82A adjacent to the second notch 74 is located above the common end 86 between the straight edge 82B of the second notch 74 and the inclined edge 80A of the first notch 72.

Moreover, in the particular example shown in FIG. 4, the inclined edge 82A of each second notch 74 has a first inclined region 88 of inclination, taken with respect to a plane that is perpendicular to the axis A-A', which is less than the inclination of the second inclined region 90.

From the perspective of the bulkiness, the stiffness of the springs, the strokes, the inclination of the first region 88 serves the purpose of reducing the height of the straight edge 80B, while also maintaining a sufficient inclination so as to cause the rotating member 54 to rotate.

The region 90 is more inclined so as to enable the surface 82A to reach the bottom 74 with a corresponding dimension necessary to the raising of the actuating rod 56, during the unlocking phase.

The angular extension about the axis A-A' of first inclined region 88 is also less than that of the second inclined region 90.

Advantageously, the sleeve 50 and the tappet 52 are angularly indexed so that each first nick 62 is angularly disposed substantially opposite a second notch 74, and each second nick 64 is angularly disposed substantially opposite a first notch 72.

The rotating member 54 has a base 91 and a plurality of circumferential protrusions 92 intended to cooperate successively with the nicks 62, 64 and the notches 72, 74 when the bistable actuator 34 is operated. This cooperation causes, as will be seen below, the rotating member 54 and the protrusions 92 to be driven in rotation about axis A-A'.

In the example shown in FIG. 3, the protrusions 92 are formed by bevelled teeth circumferentially extending away from the axis A-A' in distinct angular sectors about the axis A-A'. The protrusions 92 protrude out in relation to the base 91.

The rotating member 54 is advantageously interposed between the tappet 52 and the actuating rod 56.

The rotating member 54 is intended to press on the actuating rod 56 when it is pushed by the tappet 52. It is free to pivot about the axis A-A' in relation to the actuating rod 56 and in relation to the tappet 52.

The first interior spring biasing member 58 is interposed between the actuating rod 56 and the head 30 so as to bias the actuating rod 56 to its retracted position.

As has been seen above, the actuating rod 56 is partially inserted into the axial passage 40. It is displaceable along the axis A-A' in the passage 40 between the extended position and the retracted position.

The second interior spring biasing member 58A is interposed between the rotating member 54 and the tappet 52 to return the tappet 52 to its retracted position in the sleeve 50.

The third rotatable member 58B is received in a recess provided at the upper end of the rod 56. It presses on the base 91 of the rotating member 54 in order to move this member 54 away from the rod 56.

In the extended position, the actuating rod 56 extends opposite the radial passages 42. It pushes the anchoring fingers 32 to their active positions projecting out radially.

In the retracted position, the actuating rod 56 extends above the radial passages 42. The fingers 32 are thus thereafter to be sliding in the passages 42 to their retracted positions.

As discussed in more detail further below, the tappet 52 is capable of being moved along the axis A-A' following a succession of first impulses and second impulses. Each first impulse and each second impulse includes a first stroke along the axis A-A' in the first direction downwards, and a second stroke along the axis AA' in a second direction opposite to the first direction.

During each first impulse, the tappet 52 is able to cause the actuating rod 56 to switch from its retracted position to its extended position.

Thereafter, during each second impulse, the tappet 52 is capable of causing the actuating rod 56 to switch from its extended position to its retracted position.

According to the invention, the actuator 34 is configured so as to allow the return of the actuating rod 56 to its retracted position when the tappet 52 moves in the first direction downwards, during the second impulse.

The trigger 32 includes a pin 100, a return spring 102 and a stop member 104 to be pushed in the head 30 when it is placed in abutment position in the anchoring grid.

Conversely, when the pin 100 projects out of the head 30 under the effect of the spring 102, the pin 100 blocks the movement of the actuating rod 36 and, more generally, the operation of the bistable actuator 34.

The operation of the bistable actuator 34 is advantageously ensured by means of the same fluid as that controlling the piston 20, through the application of successive pressure impulses in the jack 16.

It is thus possible to use only pressure impulses in the jack 16, without having to maintain the pressure therein. A single first pressure impulse brings about the release of the fingers 32, while a single second pressure impulse brings about their return.

The source of supply 29 of pressurised fluid for the jack 16 is illustrated for example in FIG. 6.

It comprises a reservoir in the form of a gas cartridge 110 for example a consumable cartridge of carbon dioxide. This cartridge 110 is connected to a solenoid valve 112, for example of the type 3/2 normally closed, itself connected to the adjustable throttling means 114 making it possible to limit the flow of gas during the harpooning and the purging.

A safety valve 116, set to a pressure slightly higher than the desired harpooning pressure is also provided, all this being connected to the internal chamber of the cylinder 18, opposite the piston 20.

The operation of the harpoon 10 according to the invention will now be described .

During an initial phase 120 shown in FIGS. 1, 7 and 8, the harpoon 10 is inactive. The portions 26, 28 of the cylinder 18 are retracted one into the other. The rod 22 of the piston 20 is retracted into the cylinder 18 and the anchor head 30 is located in the vicinity of the flying object.

In this configuration, the tappet 52 is raised in the sleeve 50. The radial protrusions 92 of the rotating member 54 are received in the first nicks 62 at the bottom thereof (see FIG. 8).

The first interior spring biasing member 58 then pushes the actuating rod 56 into its retracted position and holds the protrusions 92 against the bottom of the first nicks 62.

When the harpooning of the flying object is to be carried out, a first impulse of pressurised fluid is provided in the cylinder 18. During the increase in pressure (phase 122), the pressurised fluid causes the deployment of the lower portion 28 relative to the upper portion 26 of the cylinder, then the deployment of the rod 22 of the piston 20 out of the cylinder 18 in order to move the anchor head 30 into the cell 14 against the elastic restoring force generated by the exterior spring biasing member 36.

The length of the harpoon 10 is gradually increased (FIG. 7).

A supply of pressurised fluid causes in addition the first stroke in the first direction towards the bottom of the tappet 52. During this first stroke, the tappet 52 moves along the axis A-A' and pushes the protrusion 92 of the rotating member 54 out of the first nick 62.

The first nick 62 being located angularly in front of the first inclined edge 80A of a first notch 72, the protrusion 92 engaged in the first nick 62 is extracted out of the first nick 62 by the thrust of the first edge 80A on the protrusion 92.

When the notches 72, 74 of the tappet 52 are fully extracted from the sleeve 50, the protrusion 92 slides along the first edge 80A up to the bottom of the first notch 72 causing the rotation of the rotating member 54 (see FIG. 9). In this configuration, the rod 56 is pushed towards its extended position and radially deploys the fingers 32. The lock is then activated as shown in step 124 in FIG. 7.

When the fluid pressure is reduced, the tappet 52 then moves along its second stroke in a second direction opposite to the first direction, upwards in FIG. 3.

To this end, as seen in the phase 126 in FIG. 7, the pressure in the cylinder 18 is gradually decreased. The tappet 52 is retracted into the sleeve 50 under the effect of the bias from the second interior biasing member 58A and the third interior biasing member 58B. Each protrusion 92 comes into contact with a first inclined track 66 of the second nick 64 and pivots about the axis of rotation A-A'.

Since the end 84 is passed over the first inclined track 66 and since the stress of the biasing member 58A becomes lower than that of the biasing member 58B, the biasing member 58B is deployed and extends the rotating member 54 away from the rod 56 so as to maintain the protrusions 92 at the bottom of the second nick 64. The protrusions 92 are found under the track 88, which corresponds to the rearming of the tappet 52.

Moreover, due to the restoring force of the exterior spring biasing member 36, the fingers 32 are applied under the grid 12, the piston 20 is retracted, the actuating rod 56 is secured against lateral movement, the biasing member 58 remains inactive and the lower portion 28 rises into the upper portion 26 slightly reducing the length of the harpoon, as shown in FIG. 7. The clamping force then increases.

The fluid pressure in the cylinder 18 can then be brought substantially to zero, while maintaining a significant clamping force during the phase 128 shown in FIG. 7.

During the phase 130, a second pressure impulse is generated. This second impulse consists firstly of the supply of pressurised fluid in the cylinder 18.

This causes the progressive deployment of the portions 24, 26 of the cylinder 18 of the rod 22 of the piston 20 and a first stroke of the tappet 52 relative to the sleeve 50 in the first direction downwards.

During this stroke, the first edge 82A of each second notch 74 comes into contact with the protrusion 92 of the rotating member 54. The thrust of the tappet 52 then disengages the protrusion 92 of the second nick 64.

This being done, the protrusion 92 rises in the second slot 74 up to the bottom of the notch 74, thereby causing the rotation of the rotating member 54. This allows a stroke of the actuating rod 56 in upwards direction relative to the head 30, even when the sleeve 52 is in abutment against the head 30.

This stroke releases the actuating rod 56 which passes from its extended position to its retracted position under the effect of the thrust of the first interior spring biasing member 58. The radial passage 42 located in front of each finger 32 is then disengaged.

This allows the movement of each anchoring finger 32 radially towards the axis A-A' so as to enable their retraction.

Consequently, the actuating rod 56 releases the axial passage 40 facing each radial passage 42 and the fingers 32 are free to slide radially towards the axis A-A' in the radial passage 42 (phase 132, FIG. 11).

As illustrated in FIG. 7, the harpoon 10 is then unlocked and this occurs as soon as the tappet 52 has executed its first stroke in the first direction, during each second impulse. This release of the fingers 32 is effective before the return of the tappet 52 to the sleeve 50 during the second stroke of the tappet 52 in the second direction.

The risk of blocking of the anchoring assembly 24 is thus eliminated, even when the exterior biasing member 36 has a stiffness that is greater than that of the interior biasing member 58.

Then, during the phase 134, when the fluid pressure applied in the cylinder 18 progressively decreases, the length of the harpoon 10 correspondingly decreases, and the clamping force decreases, under the effect of the deployment of the exterior spring biasing member 36.

Under the effect of the biasing of the second biasing member 58A, the tappet 52 rises back into the sleeve and reaches the retracted position illustrated in FIG. 8.

The flying object is then free to be released from the platform in order to execute a flight.

The use of a bistable actuator 34 with rotary mechanical lock thus makes it possible to maintain the harpoon 10 in its position between two impulse orders for change of state, namely folded or blocked in the grid.

The switch from one state to another is carried out by means of the application of a fluid pressure impulse into the jack. This allows for the use for example of a consumable cartridge to drive the jack.

The use of a biasing member 38 of high stiffness makes it possible to generate a high clamping force.

However, the bistable actuator 34 allowing the retraction of the fingers 32 during the first stroke downwards from the second impulse, the risk of locking the fingers 32 in the deployed position is almost nonexistent in the harpoon 10 according to the invention.

The invention claimed is:

1. A harpoon for anchoring capable of cooperating with an anchoring grid of a platform, the harpoon comprising:
   a cylinder,
   a piston provided with a rod projecting out beyond the cylinder, a free end of the rod comprising an anchoring head for anchoring in the grid and at least one anchoring finger deployable relative to the anchor head between a retracted position and an active position projecting outwards;
   a bistable actuator including a rod for actuating the or each finger, the actuating rod being movable between a retracted resting position allowing the retraction of the or each finger and an extended position of deployment of the or each finger, the bistable actuator comprising a tappet that is movable during a first impulse comprising a stroke in a first direction along an axis of movement, and then a stroke in a second direction opposite to the first direction, in order to cause the switch of the actuating rod from its retracted position to its extended position, the tappet being movable during a second impulse comprising a stroke in the first direction, and then a stroke in the second direction in order to cause the switch of the actuating rod from its extended position to its retracted position;
   wherein the actuator is configured so as to allow the return of the actuating rod to its retracted position without release of pressure in the cylinder when the tappet moves along the first stroke in the first direction during the second impulse.

2. A harpoon according to claim 1, wherein the cylinder comprises at least two telescopic cylinder parts the one being within the other, so as to be movable between a retracted position where one is retracted into the other and an active position with one protruding out in relation to the other.

3. A harpoon according to claim 1, further comprising a rotating member rotatable relative to the tappet and relative to the actuating rod the rotating member being interposed between the tappet and the actuating rod, the rotating member having at least one protrusion intended to cooperate with the tappet so as to cause the rotation of the rotating member.

4. A harpoon according to claim 3, wherein the bistable actuator comprises a sleeve that is movable together with the rod of piston, the tappet being mounted so as to be movable in the sleeve, the sleeve delineating a plurality of nicks for receiving the radial protrusion designed to receive the radial protrusion at the end of each impulse.

5. A harpoon according to claim 3, wherein the tappet defines at least one first notch and at least one second notch spaced angularly in relation to the first notch, the first notch being intended to receive the protrusion during the first impulse, the second notch being intended to receive the protrusion during the second impulse, the second notch having a depth greater than that of the first notch.

6. A harpoon according to claim 5, wherein the distance separating the bottom of the first notch and the bottom of the second notch along the axis of movement of the tappet is substantially equal to or greater than the stroke of the actuating rod between its extended position and its retracted position.

7. A harpoon according to claim 5, wherein each first notch and each second notch is delineated by at least one edge that is inclined relative to a plane that is perpendicular to the axis of movement of the tappet.

8. A harpoon according to claim 7, wherein the inclined edge of the second notch includes a first inclined region, and a second inclined region, the first inclined region advantageously having an inclination that is less than that of the second inclined region.

9. A harpoon according to claim 1, further comprising a first interior spring biasing member, interposed between the anchoring head and the actuating rod to resiliently bias the actuating rod to its retracted position.

10. A harpoon according to claim 9, further comprising an exterior spring biasing member, intended to be interposed between the anchoring head and a member for fastening to the flying object, in order to cause a resilient bias of the actuator head towards the fastening member, the stiffness of the exterior spring biasing member being greater than the stiffness of the first interior spring biasing member.

11. A method for anchoring a harpoon on an anchoring grid, the method comprising the following steps:
   of inserting the anchoring head of a harpoon according to claim 1 in a cell of the grid,
   actuating the tappet so as to execute a first impulse comprising a stroke in a first direction, and then a stroke in a second direction opposite to the first direction along an axis of movement in order to cause the switch of the actuating rod from its retracted position to its extended position;

deploying the anchoring fingers to their active position projecting outwards ;

then actuating the tappet so as to execute a second impulse comprising a stroke in the first direction, and then a stroke in the second direction along the axis of movement;

returning the actuating rod to its resting position during the second impulse, during the first stroke of the tappet in the first direction before the second stroke of the tappet in the second direction.

12. A method according to claim 11 further comprising, after the return of the actuating rod to its retracted position, the extraction of the anchoring head out of the grid.

* * * * *